(12) United States Patent
Chen

(10) Patent No.: US 8,256,734 B1
(45) Date of Patent: Sep. 4, 2012

(54) SUPPORT APPARATUS FOR DEVICE

(75) Inventor: Mu-Szu Chen, New Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/214,264

(22) Filed: Aug. 22, 2011

(30) Foreign Application Priority Data

Jun. 9, 2011 (TW) .............................. 100120237 A

(51) Int. Cl.
*A47B 97/00* (2006.01)

(52) U.S. Cl. .................. 248/500; 248/309.1; 248/316.1; 248/316.5; 248/451; 248/918

(58) Field of Classification Search .................. 248/451, 248/450, 453, 458, 447, 500, 505, 917, 918
See application file for complete search history.

(56) References Cited

U.S. PATENT DOCUMENTS

| | | | | |
|---|---|---|---|---|
| 4,081,978 A | * | 4/1978 | Ivey | 70/58 |
| 6,053,467 A | * | 4/2000 | Walker et al. | 248/450 |
| 6,454,234 B1 | * | 9/2002 | Westbrook | 248/317 |
| 7,370,840 B1 | * | 5/2008 | Deconinck | 248/316.1 |
| D602,938 S | * | 10/2009 | Ward et al. | D14/434 |
| D646,315 S | * | 10/2011 | Orf | D16/242 |
| 2007/0285742 A1 | * | 12/2007 | Wolberg et al. | 358/498 |
| 2010/0294908 A1 | * | 11/2010 | Mish et al. | 248/451 |

* cited by examiner

*Primary Examiner* — Amy J Sterling
(74) *Attorney, Agent, or Firm* — Altis Law Group, Inc.

(57) ABSTRACT

The support apparatus includes a base, a pair of supporting arms, and a locking element. The base defines at least one engaging projection on a top thereof. Each supporting arm includes a body having a first curved end and a second curved end extending from the two opposite ends thereof. The first curved end is connected to the base and the second curved end is positioned in the locking element. The locking element defines a rail, and two curved protruding blocks extend from the two opposite ends of the rail. When the at least one engaging projection is engaged with a side of an external device, the supporting arms rotate relative to the base and the locking element sits on top of the external device, and the rail and the protruding blocks holds another side of the external device.

6 Claims, 7 Drawing Sheets

SUPPORT APPARATUS FOR DEVICE

BACKGROUND

1. Technical Field

The disclosure relates to support apparatuses and, more particularly, to a support apparatus for an electronic device.

2. Description of Related Art

A conventional support apparatus often clamps an external device in a vertical direction, when the support apparatus and the clamped external device rotate and/or move together, the external device can easily detaches from the support apparatus. Furthermore, some support apparatuses need to be fastened on the external device, which leads to a complex structure and cost more.

Therefore, what is needed is a support apparatus to overcome the described shortcoming.

DETAILED DESCRIPTION

Figure 1:
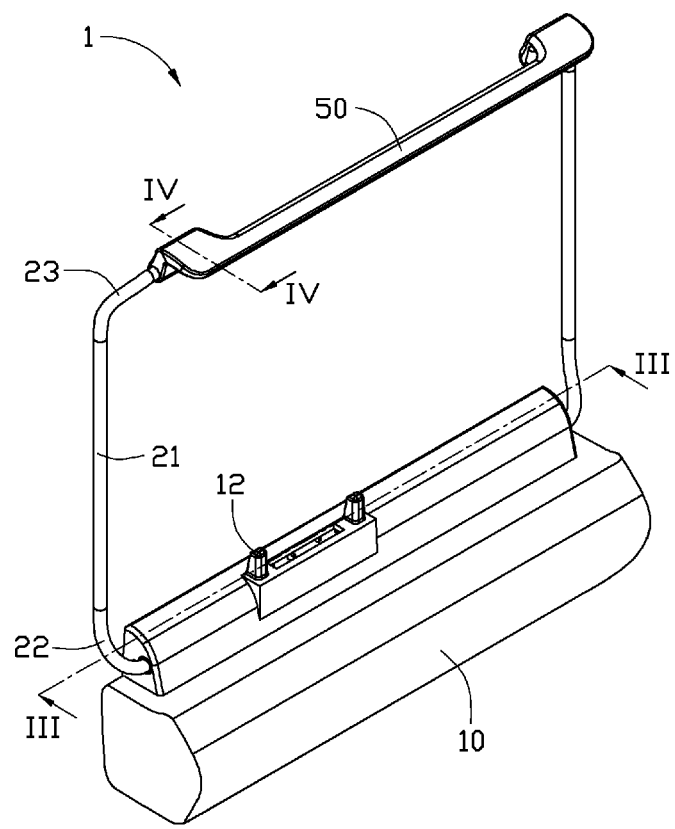
FIG. 1 is a perspective view of a support apparatus, in accordance with an exemplary embodiment.
Figure 2:
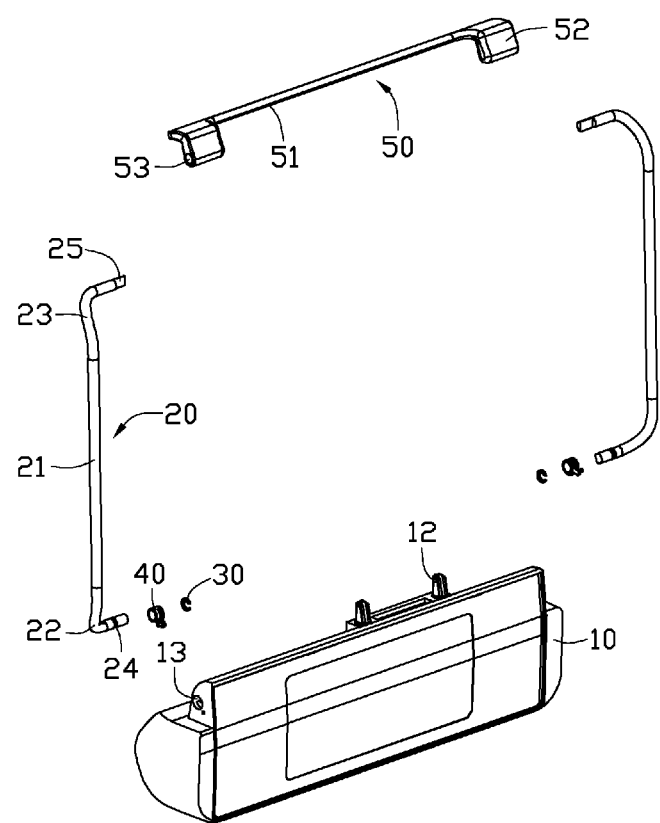
FIG. 2 is an exploded, perspective view of the support apparatus of FIG. 1.
Figure 3:
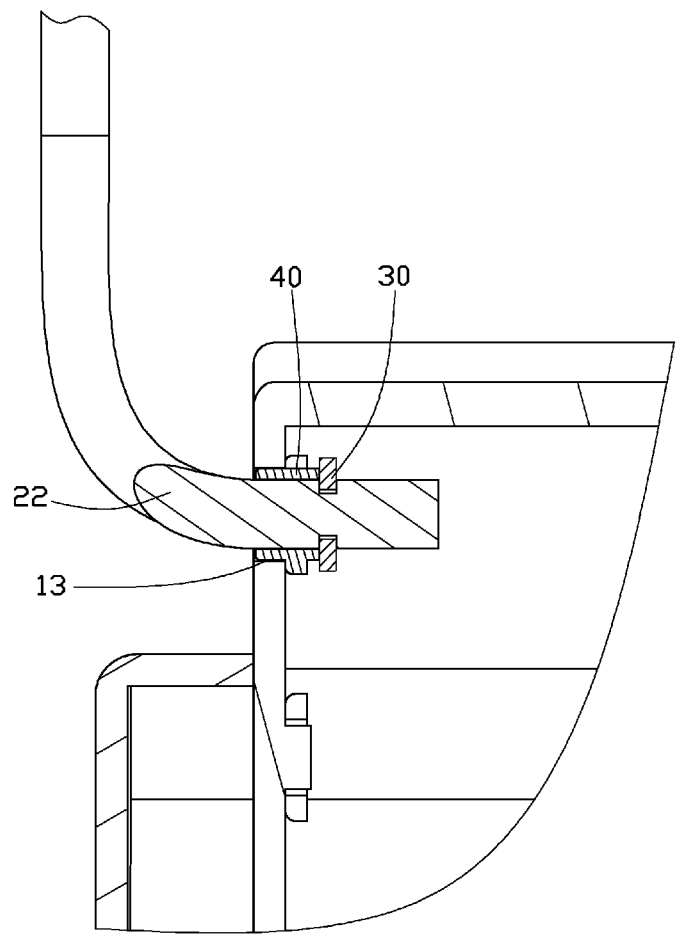
FIG. 3 is a cross-sectional view taken along line of the support apparatus of FIG. 1.
Figure 4:
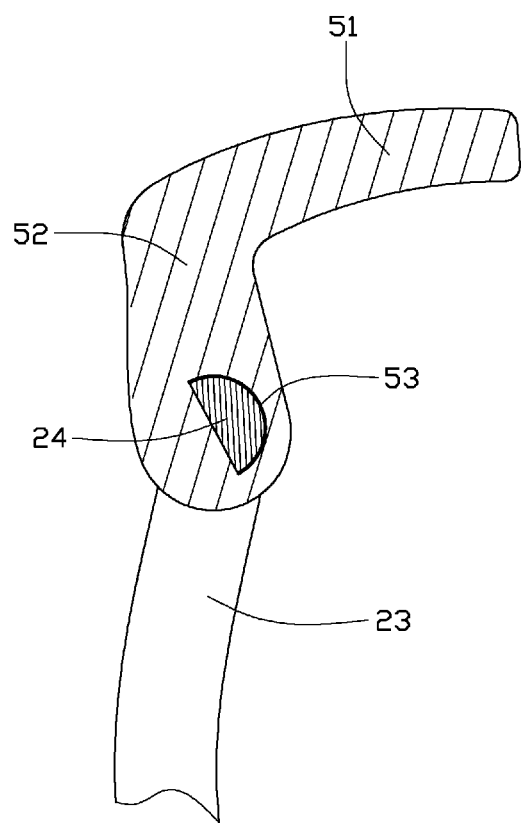
FIG. 4 is a cross-sectional view taken along line IV-IV of the support apparatus of FIG. 1.

Referring to FIGS. 1-4, a support apparatus 1 is utilized for supporting an external device, such as a mobile phone, or an E-reader. The support apparatus 1 includes a base 10, a pair of supporting arms 20, and a locking element 50.

The base 10 defines at least one engaging projection 12 on a top side thereof and a circular through hole 13 on two opposite sides thereof, respectively. In the embodiment, the base 10 has a hollow structure. The at least one engaging projection 12 is utilized for engaging with one end of the external device. In the embodiment, the number of the at least one engaging projection 12 is two.

Each supporting arm 20 is substantially in a "[" shape. It includes a body 21 having a first curved end 22 and a second curved end 23 extending from the two opposite ends of the body 21, respectively. The first and second curved ends 22, 23 are cylindrical-shaped. In the embodiment, the first curved end 22 and the second curved end 23 are solid. The first curved end 22 is connected to the base 10 and may rotate relative to the base 10. The second curved end 23 has cut-away a segment along an extension direction thereof and forms a wedge-shaped end 25 thereof. The second curved end 23 is connected to the locking element 50.

The support apparatus 1 further includes a pair of circlips 30. The first curved end 22 of each supporting arm 20 further defines a hollowed circular groove 24 in the circumferential surface thereof. The curved end 22 passes through one of the circular through holes 13. One of the circlips 30 is engaged in the circular groove 24 and coiled around the first curved end 22, and a diameter of the circlip 30 is greater than the transverse size of the first curved end 22 and the size of the through hole 13, therefore the first curved end 22 can be prevented from disengaging from the base 10. The support apparatus 1 further includes a pair of sleeves 40. Each of the sleeves 40 is arranged around one of the first curved ends 22 and is positioned extending through the circular through hole 13 of the base 10 between the base 10 and the circular groove 24. The pair of sleeves 40 is configured to help achieve a smooth rotation for the supporting arms 20 and prevent some impurities from entering into the base 10.

The locking element 50 defines a rail 51. Two curved protruding blocks 52 vertically extend from the two ends of the rail 51. One side of each protruding block 52, away from the rail 51, defines a receiving hole 53. The locking element 50 is made of flexible material.

For each supporting arm 21, the wedge-shaped end 25 of the second curved end 23 is positioned in the receiving hole 53 and the locking element 50 may rotate a predetermined angle range relative to the wedge-shaped end 25. When the at least one engaging projection 12 is engaged with a side of the external device, the supporting arms 20 rotate relative to the base 10 and the locking element 50 is positioned on the top of the external device, and the rail 51 and the protruding blocks 52 hold another side of the external device.

Figure 5:
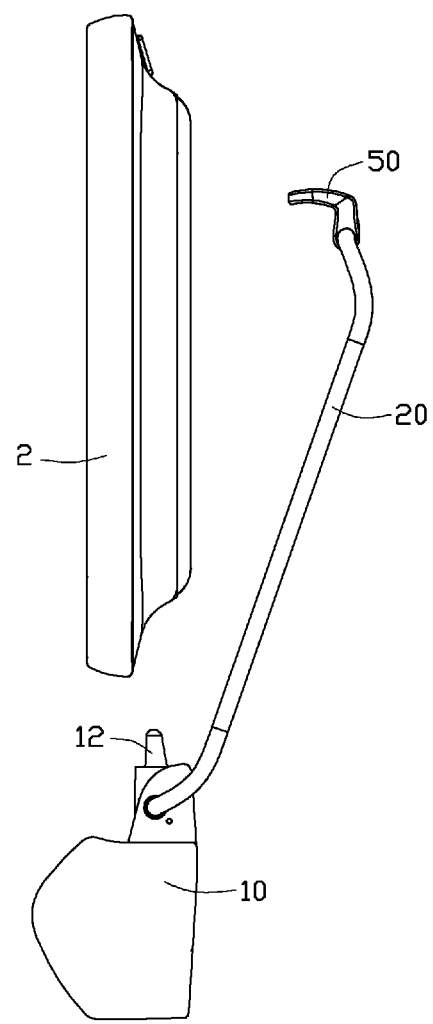
FIG. 5 is a side view of the support apparatus of FIG. 1 with an external device, before clamping the external device.
Figure 6:
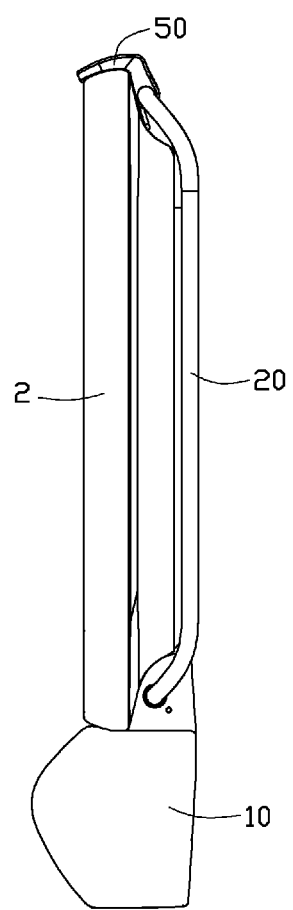
FIG. 6 is a side view of the support apparatus of FIG. 1 when clamping an external device.
Figure 7:
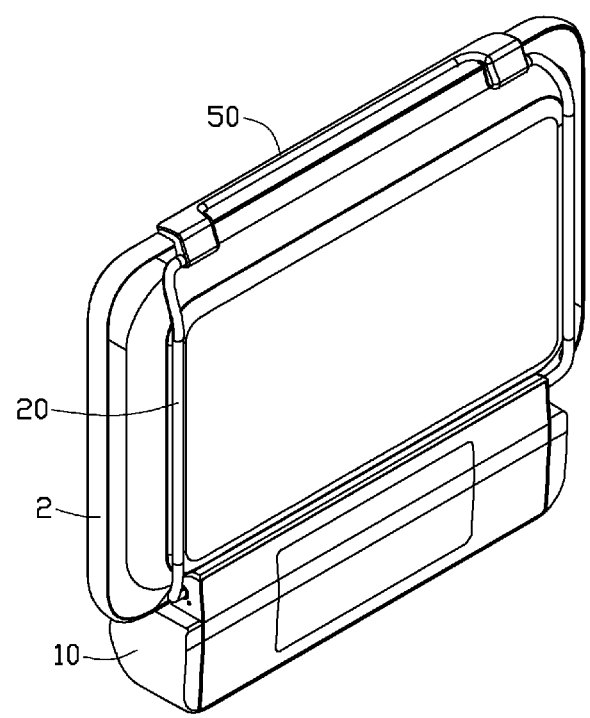
FIG. 7 is a perspective view of the support apparatus of FIG. 1 when clamping the external device.

Referring to FIGS. 5-7, for illustration purposes, an E-reader 2 is used as an example of the external device. The support apparatus 1 is positioned on a horizontal surface and the supporting arms 20 are rotated relative to the base 10. The at least one engaging projection 12 is engaged with the bottom of the E-reader 2. The supporting arms 20 rotate relative to the base 10 and the locking element 50 sits on top of the E-reader 2, and the rail 51 and the protruding blocks 52 hold a side of the E-reader 2. Therefore, the support apparatus 1 can clamps the E-reader 2 and turns together with the clamped E-reader 2 relative to the base 10.

When a user wants to detach the E-reader 2 from the support apparatus 1, The user may push the locking element 50 backward and remove the E-reader 2 from the at least one engaging projection 12.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A support apparatus comprising:
   a base defining at least one engaging projection on a top thereof;
   a pair of supporting arms, each supporting arm comprising a body having a first curved end and a second curved end extending from the two opposite ends of the body, respectively, the first curved end rotatably connected to the base; and
   a locking element comprising a rail, two curved protruding blocks extending from the two opposite ends of the rail;
   wherein the second curved end is positioned in the protruding block, when the at least one engaging projection is engaged with one side of an external device, the supporting arms are operable to rotate relative to the base and the locking element sits on top of the external device, and the rail and the protruding blocks hold another side of the external device; and
   the second curved end has cut-away a segment along the extension direction thereof and forms a wedge-shaped end, one side of each protruding block defines a receiving hole, the wedge-shaped end is positioned in the receiving hole, and the locking element may rotate a predetermined angle range relative to the wedge-shaped end.

2. The support apparatus as recited in claim 1, wherein each supporting arm is substantially in a "[" shape.

3. The support apparatus as recited in claim 1, further comprising a pair of circlips, two opposite sides of the base defining a circular through hole, wherein the first curved end of each supporting arm further defines a hollowed circular groove in the circumferential surface thereof, the first curved end passes through the circular through hole and is positioned in the base, the circlip is engaged in the circular groove and coiled around the first curved end, and a diameter of the circlip is greater than the transverse size of the curved end and the size of the circular through hole.

4. The support apparatus as recited in claim 3, further comprising a pair of sleeves, wherein the sleeve is arranged around the first curved end and is positioned extending through the circular through hole of the base between the base and the circular groove.

5. The support apparatus as recited in claim 1, wherein the locking element is made of flexible material.

6. The support apparatus as recited in claim 1, wherein the number of the at least one engaging projection is two.

* * * * *